US012609999B1

(12) United States Patent
Tian et al.

(10) Patent No.: US 12,609,999 B1
(45) Date of Patent: Apr. 21, 2026

(54) SYSTEMS AND METHODS FOR UNIVERSAL LAYER 2 MESSAGING

(71) Applicant: CABLE TELEVISION LABORATORIES, INC., Louisville, CO (US)

(72) Inventors: Yuan Tian, Broomfield, CO (US); Darshak Thakore, Broomfield, CO (US); Massimiliano Pala, Denver, CO (US); Tao Wan, Ottawa (CA)

(73) Assignee: Cable Television Laboratories, Inc., Louisville, CO (US)

( * ) Notice: Subject to any disclaimer, the term of this patent is extended or adjusted under 35 U.S.C. 154(b) by 312 days.

(21) Appl. No.: 18/210,525

(22) Filed: Jun. 15, 2023

Related U.S. Application Data

(60) Provisional application No. 63/352,268, filed on Jun. 15, 2022.

(51) Int. Cl.
| | |
|---|---|
| *H04L 69/18* | (2022.01) |
| *H04L 12/28* | (2006.01) |
| *H04W 12/0433* | (2021.01) |
| *H04W 80/02* | (2009.01) |

(52) U.S. Cl.
CPC .......... *H04L 69/18* (2013.01); *H04L 12/2801* (2013.01); *H04W 12/0433* (2021.01); *H04W 80/02* (2013.01)

(58) Field of Classification Search
CPC . H04L 69/18; H04L 12/2801; H04W 12/0433
See application file for complete search history.

(56) References Cited

U.S. PATENT DOCUMENTS

| | | | | |
|---|---|---|---|---|
| 2006/0072615 A1* | 4/2006 | Narad | ................. | H04L 12/2854 |
| | | | | 370/474 |
| 2018/0242174 A1* | 8/2018 | Thotad | ................ | H04L 41/0668 |
| 2019/0288874 A1* | 9/2019 | White | .................... | H04L 67/04 |
| 2023/0254748 A1* | 8/2023 | Avadhanam | ........ | H04W 36/304 |
| | | | | 370/331 |

* cited by examiner

*Primary Examiner* — Kevin M Cunningham
(74) *Attorney, Agent, or Firm* — Armstrong Teasdale LLP

(57) ABSTRACT

A transmitting communication device is provided, and includes a processor and a memory. The memory has computer-executable instructions stored therein, which, when executed by the processor, cause the transmitting communication device to generate at least one layer 2 message frame for delivery to a remote receiving device over an electronic communication network. The generated at least one layer 2 message frame includes a cross protocol payload (XPP). The XPP includes a first protocol identifier identifying a first communication protocol, a first protocol package containing first data content according to the first communication protocol, a second protocol identifier identifying a second communication protocol different from the first communication protocol, and a second protocol package containing second data content according to the second communication protocol.

20 Claims, 14 Drawing Sheets

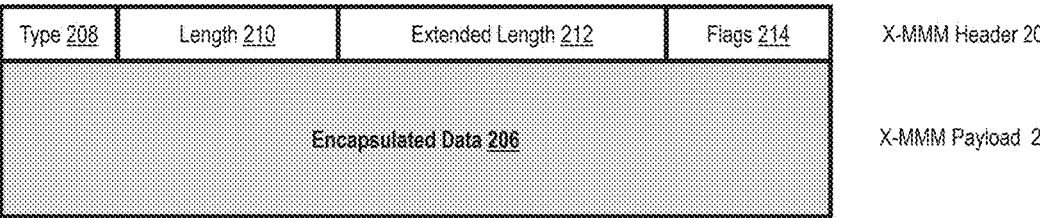
FIG. 2

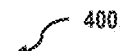
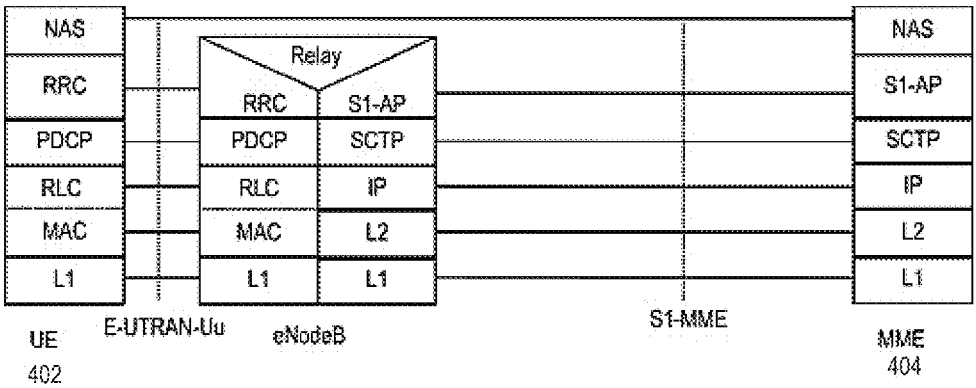
FIG. 4

FIG. 12A                    FIG. 12B

SYSTEMS AND METHODS FOR UNIVERSAL LAYER 2 MESSAGING

CROSS REFERENCE TO RELATED APPLICATIONS

This application claims the benefit of and priority to U.S. Provisional Application No. 63/352,268, filed Jun. 15, 2022, which is hereby incorporated by reference in its entirety.

FIELD

The field of the invention relates generally to communication network messaging protocols, and more specifically, to systems and methods for encapsulating messages and message frames for network convergence.

BACKGROUND

Conventional communication networks utilize the Data Over Cable Service Interface Specification (DOCSIS) protocol for digital communication over wired (e.g., fiber, cable, hybrid fiber coaxial (HFC), etc.) and free space optical (FSO) systems, and for modems interfacing with many wireless communication protocols. DOCSIS was introduced (i.e., version 1.0) was introduced by the present Assignee in 1997, followed by DOCSIS 1.1 in 2001, DOCSIS 2.0 in 2002, DOCSIS 3.0 in 2006, and DOCSIS 3.1 in 2013. The present Assignee issued DOCSIS 4.0 in 2019, and the industry has been rapidly working to upgrade existing network technologies to take full advantage of the increased speeds and advanced capabilities provided by DOCSIS 4.0.

At present though, there is no messaging mechanism in DOCSIS that allows a modem or modem termination system (MTS) to encapsulate, reroute, and/or convey protocols used for network convergence. That is, DOCSIS 4.0 does not yet include support for encapsulating other, non-DOCSIS, protocol frames for configuration and authentication messages of devices beyond the modem (e.g., cable modem, or CM). Because network convergence for wired infrastructures is an ongoing area of interest and development in the industry, this lack of protocol support and flexibility remains a significant challenge to future technical adaptation and advancement. Accordingly, there is a desire in the industry for support mechanisms to encapsulate other protocol messages and message frames.

Additionally, there is a further desire in the industry for network operators to offer services, such as public key infrastructure (PKI) certificate renewals, etc., to devices, but, for security reasons, without allowing full access to the network by the device for which renewal is sought. Because network convergence utilizes a common infrastructure, there is a need in the field to enable devices to parse and convey message content to another device/entity, but while ensuring the authenticity of both devices or entities without adding unnecessary operational and management challenges or costs to network operators.

For example, conventional networks typically require a truck roll to remediate IP connectivity failures. Truck rolls, however, are time consuming and costly. Network operators have therefore expressed a desire to be able to remediate such IP connectivity failures remotely, from one or more of the existing network devices (e.g., a modem or CM) instead of a truck roll. Moreover, operators utilizing more than one device for such remediation measures would need to ensure that the configuration of routers is aligned with a connected modem/CM. Accordingly, a further goal of the present application is to simplify the set-up process to enable device configuration, or a software update thereto, to come from the modem side, which may then be more easily managed by network operators in a much more cost-effective manner.

SUMMARY

A transmitting communication device includes a processor and a memory. The memory has computer-executable instructions stored therein, which, when executed by the processor, cause the transmitting communication device to generate at least one layer 2 message frame for delivery to a remote receiving device over an electronic communication network. The generated at least one layer 2 message frame includes a cross protocol payload (XPP). The XPP includes a first protocol identifier identifying a first communication protocol, a first protocol package containing first data content according to the first communication protocol, a second protocol identifier identifying a second communication protocol different from the first communication protocol, and a second protocol package containing second data content according to the second communication protocol.

BRIEF DESCRIPTION

These and other features, aspects, and advantages of the present disclosure will become better understood when the following detailed description is read with reference to the following accompanying drawings, in which like characters represent like parts throughout the drawings.

FIG. 2 is a schematic illustration depicting an exemplary implementation of a cross protocol payload, in accordance with an embodiment.

FIG. 4 is a schematic illustration depicting an exemplary network architecture for implementing one or more of the embodiments herein.

Figure 12:
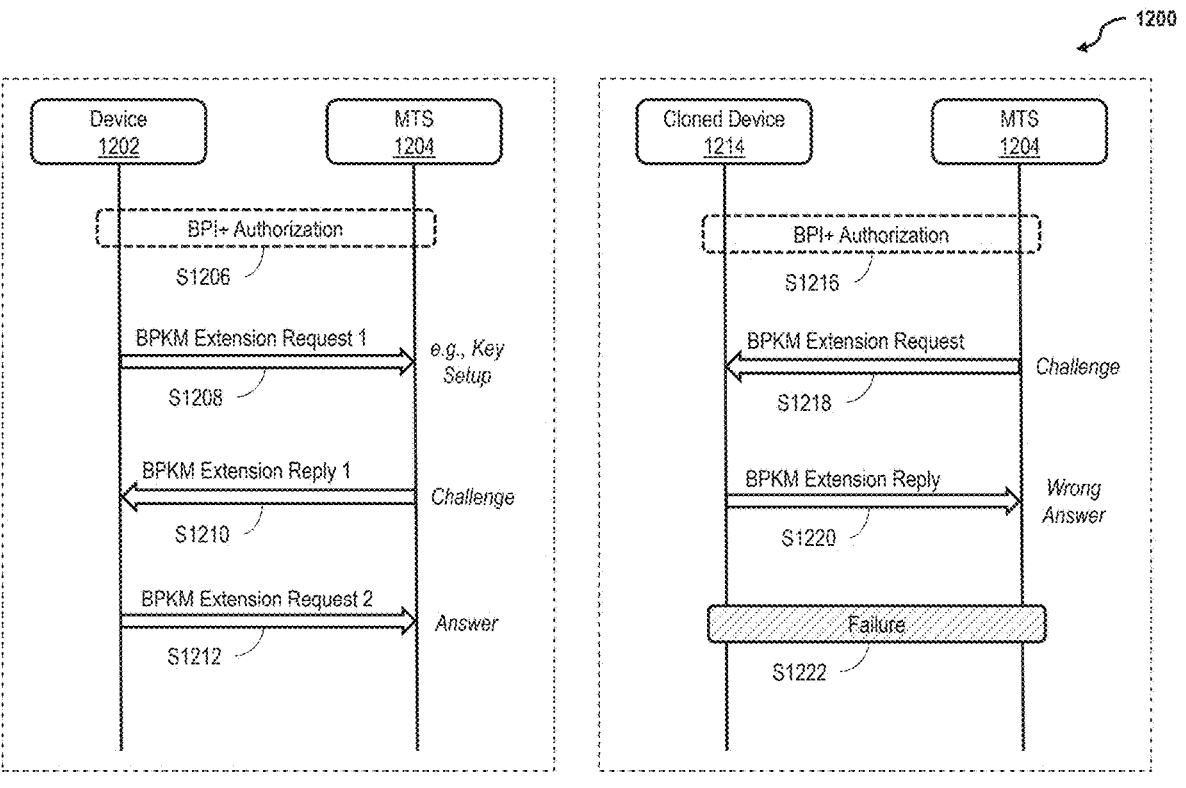

FIGS. 12A-B are sequence flow diagrams depicting an exemplary two factor authentication process utilizing the exemplary extensible messages of the present embodiments.

Figure 13:
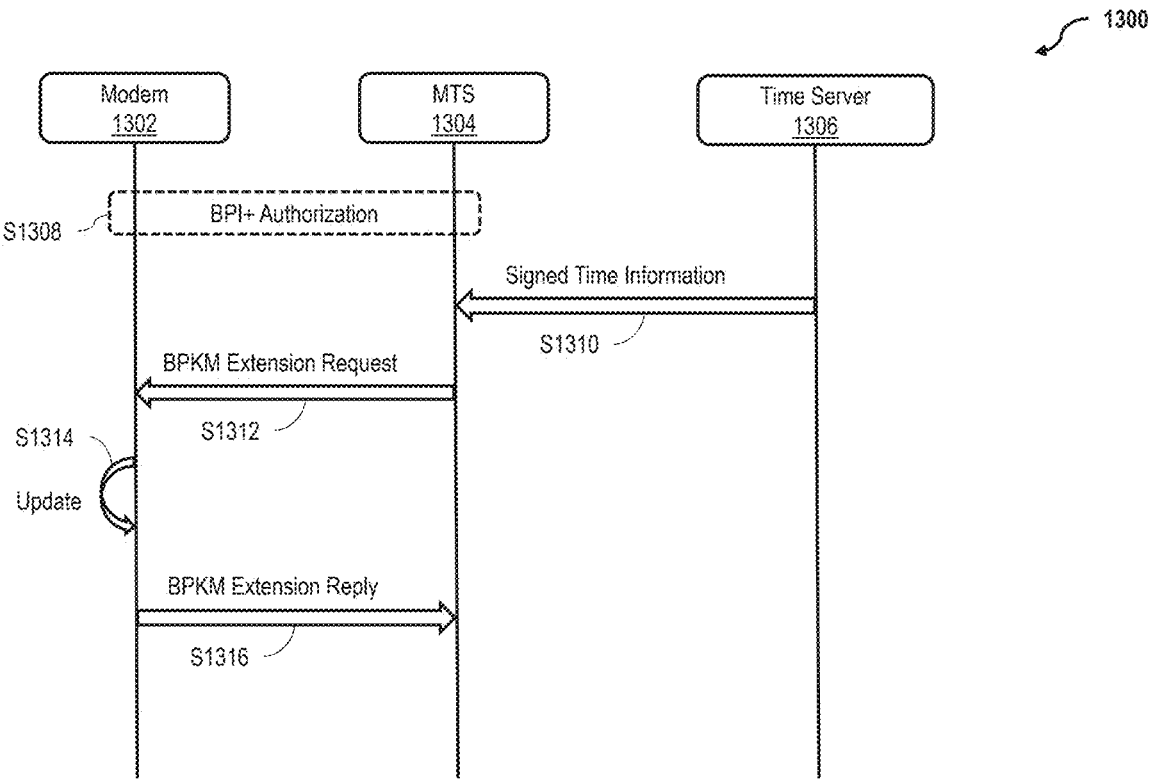

FIG. 13 is a sequence flow diagram depicting an exemplary device synchronization process utilizing the exemplary extensible messages of the present embodiments.

Figure 14:
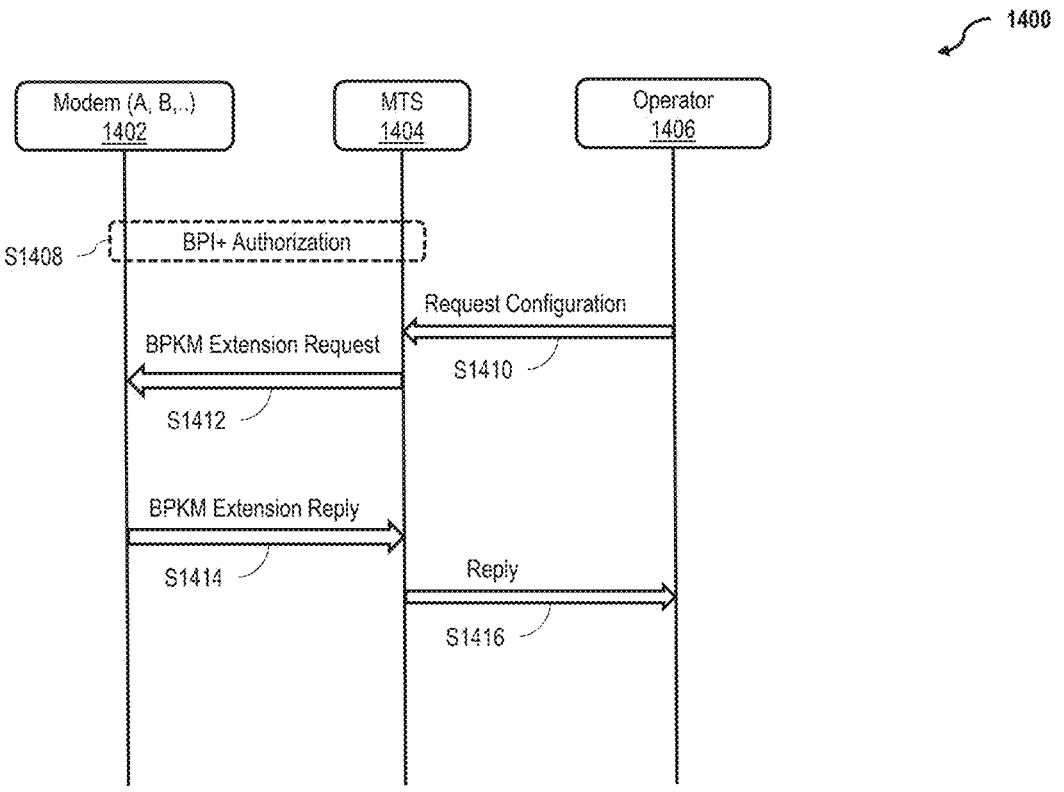

FIG. 14 is a sequence flow diagram depicting an exemplary troubleshooting process utilizing the exemplary extensible messages of the present embodiments.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner.

Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) layer and physical layer (PHY) interface, both of which may be 802.11-conformant and/or 802.16-conformant to a wireless medium (WM).

As used herein, a Third Generation Partnership Project (3GPP) device is a device that utilizes 3GPP access technology to connect to another device or gateway over a wired or wireless, and which support the Non Access Stratum (NAS).

As used herein, unless specified to the contrary, "modem termination system," or "MTS" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

The following embodiments describe systems and methods for new, supplemental extensible layer 2 messages that enable significant improvements for network convergence capabilities. Network convergence provides flexible and seamless user experiences by supporting wireless, wired and mobile services within the same infrastructure. From the network operator perspective, network convergence may desirably reduce both operational costs and implementation difficulties. In comparison with a diverged network, however, a convergence network requires support from each of the converged wireless, wired, and mobile networks thereof.

From the security perspective, however, the universal nature of network convergence, conventional systems have been challenged to converge all the messaging confidentiality, authenticity, and integrity without also having to make significant modifications to existing infrastructures. The present embodiments thus overcome these challenges by providing an innovative extensible layer 2 message that enables a wired network, for example, to support message frames and service flows utilizing many different protocols. This new extensible layer 2 message may be easily adopted by present network operators to support these multiple different protocols without requiring significant changes to their existing infrastructures.

In conventional systems, when one device or entity sends data to another device/entity, the first device uses the MAC sublayer to abstract the lower physical layer/PHY, and then must encapsulate higher-level frames into the specific physical format thereof. The present embodiments improve upon these conventional techniques by enabling the further encapsulation of different types of same-level frames into the specific physical format, instead of or alongside the higher-level frames. More particularly, whereas conventional techniques capture only a single protocol in the MAC layer, implementation of the present encapsulation systems and methods advantageously enables a frame to capture multiple protocols within the MAC layer, as opposed to the application layer.

For the purposes of the following discussion, the person of ordinary skill in the art will understand that the term "frame" refers to the layer 2 message, which may, for example, hold a layer 3 packet encapsulated inside the frame's payload. In some embodiments, a new extensible frame supporting multiple protocols is provided. In other embodiments, a new extensible baseline privacy key management (BPKM) message supporting multiple protocols is inserted into the payload of a conventional frame. In at least one embodiment, the payload of a conventional frame is itself modified into a new cross-protocol-payload (XPP) that supports multiple protocols from that single frame.

In some exemplary scenarios, such in the case of 3GPP NAS over DOCSIS, or Wi-Fi 802.11 over DOCSIS, the present embodiments advantageously enable the removal of TCP/IP dependencies, as well as configurations for service discovery, when executing internet-based protocols which may also be executed also for non-IP enabled devices. That is, according to the systems and methods described herein, the need for provisioning a full TCP/IP configuration may be eliminated, which is of particular utility in such cases as remote device attestation and/or automatic routing of authentication, authorization, and accounting (AAA) messages, among others.

Extensible Baseline Privacy Key Management (BPKM) Messages

The most recent DOCSIS Security Specification defines types and uses for BPKM messages. Conventional BPKM messages are used by a DOCSIS CM and/or DOCSIS CMTS for device authentication, key exchange, and renewal, as well as for message encryption, decryption, and encapsulation.

The present embodiments provide a new extensible BPKM message that supports multiple protocols, and therefore improves upon conventional BPKM messages to add significantly more flexibility and convergence support. In an exemplary embodiment, the present extensible BPKM message adds an extension to the conventional DOCSIS BKPM message to encapsulate the payload for other protocol frames (e.g., Extensible Authentication Protocol (EAP)) for convergence, authentication, and configuration on devices beyond the CM. This new extensible BPKM message thus realizes significant advantages over the conventional DOCSIS BPKM message with respect to (a) adaptability, (b) enhanced service availability, (c) layer 2 specificity, (d) backward compatibility support, (e) implementation accessibility, (f) protocol supplementation, and (g) additional security for legacy DOCSIS issues. An implementation of the present and is described further below with respect to FIG. 1.

Figure 1:
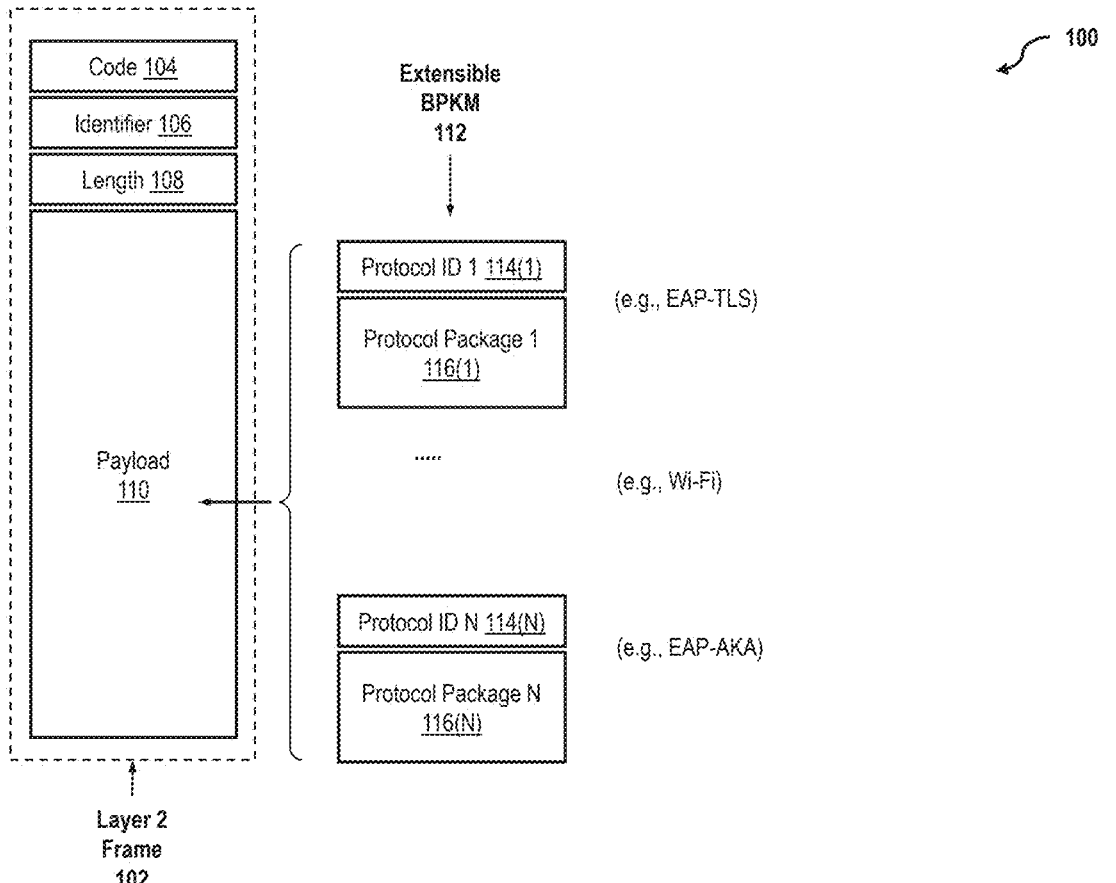
FIG. 1 is a schematic illustration depicting an exemplary data architecture for flexible protocol support, in accordance with an embodiment.

FIG. 1 is a schematic illustration depicting an exemplary data architecture 100 for flexible protocol support. In the exemplary embodiment depicted in FIG. 1, architecture 100 includes a conventional layer 2 frame structure 102 including a code portion 104, an identifier portion 106, a length portion 108, and a payload portion 110. In an exemplary embodiment, an extensible BPKM message 112, which supports a plurality (i.e., 1-N) of different protocols (e.g., EAP transport layer security (EAP-TLS), EAP authentication and key agreement (EAP-AKA), Wi-Fi, etc.) is included into payload portion 110. In this embodiment, for each supported protocol, extensible BPKM message 112 includes at least one protocol ID 114 and at least one associated protocol package 116. The person of ordinary skill in the art will appreciate that implementation of data architecture 100 does not alter the logical topology of frame structure 102, and instead need only modify the payload content therein.

This new multi-protocol, extensible layer 2 message thus represents a significant improvement to message encapsulation specified in the most recent DOCSIS versions. That is, DOCSIS currently includes fixed encapsulation for a single protocol, but does not specify further encapsulation techniques for multiple protocols in a single frame. The present inventors thus anticipate that the systems and methods described herein will be incorporated into next-generation versions of DOCSIS. For example, current IEEE specifications disclose encapsulation of the EAP protocol within a frame. In contrast, the present embodiments are advantageously enabled to capture, within a single frame, every type of protocol utilizing layer 2/MAC messages, limited only by the specified size/length of the relevant payload.

Because the present extensible BPKM or layer 2 message may already be encrypted using Baseline Privacy Interface Plus (BPI+) keys (i.e., as supported by the most recent DOCSIS specification), such extensible messages may be easily adapted for multiple scenarios. For example, the system-on-a-chip (SoC) of a typical CM may easily perform parsing using the present extensible layer 2 messages.

The present extensible messages also enable enhanced service availability. For example, some conventional service requests may not be supported by a particular CM (e.g., a credential update for a customer premises equipment (CPE)). According to the present systems and methods, the SoC of the CM is enabled to extract the relevant content and forward the extracted content to another entity until a new software update is made available. Additionally, the present extensible layer 2 messages further enable new types of services—such as remote attestation and device synchronization—to be provided that are not available using conventional encapsulation techniques.

Because the present extensible messages are within the layer 2 level (i.e., DOCSIS Layer 2), a device may be identified by only the MAC address, i.e., no IP address is needed for device identification. Furthermore, the present extensible messages eliminate the need to install, manage, and/or configure additional extra software applications that run on the application layer(s). Because layer 2 is not routable (i.e., point-to-point), access network clients will not be able to attack or probe the core network when no IP address is given. Additionally, by reducing the amount of needed message encapsulation/decapsulation from the application layer, the overall speed of message transmission through a wired network may be significantly increased. Moreover, the layer 2-specificity of the present extensible messages further enables a device to troubleshoot and/or configure for remediation (e.g., force a firmware update) where IP connectivity is not, or cannot be, established for the device.

The present extensible layer 2 messages further support backward compatibility with pre-DOCSIS CM and/or CMTS versions. With enabled extensible layer 2 messaging, an earlier DOCSIS version CM/CMTS may utilize the new extensible message to update the security feature(s) of the respective device. For example, where a DOCSIS 3.0 device supports the extensible layer 2 message, the DOCSIS 3.0 device would advantageously be enabled to utilize the present extensible message to support a Trust-On-First-Use (TOFU) for BPI+V2. In some embodiments, the code for a BPKM message may already be embedded in the SoC of the relevant device. In such cases, some changes to the SoC (e.g., message coding/interface transport, etc.) may be included to support the additional enablement of extensible BPKM message 112 for the particular device.

As described above, an extensible layer 2 message according to architecture 100 (e.g., layer 2 frame structure 102 including extensible BPKM message 112) is enabled, different from a conventional layer 2 message, to encapsulate any protocol frame for authenticating or configuring devices beyond the modem/CM. Accordingly, implementation of the present extensible layer 2 message will further enable transport over DOCSIS of any protocol type in the future (e.g., 3GPP Authentication Messages, Bluetooth, etc.). In addition to this improved implementation accessibility, the present extensible messages are versatile, and may be utilized for encapsulation of wired, wireless, and/or mobile messages.

The present extensible messages are of particular utility to supplement the capabilities of existing protocols. For example, if a particular protocol does not support message fragmentation (e.g., EAP) or integrity checks (e.g., FTP), the additional support for such features may be included in the payload or protocol content of the extensible layer 2 message (e.g., protocol package 116).

The present extensible layer 2 messages still further enable new capabilities to provide security fixes for legacy DOCSIS issues, such as prevention of attacks on a device using a previous BPI+ version. For example, implementation of the present extensible layer 2 message offer PKI renewal services (described further below) that would prevent behavior from a tampered CM using compromised certificates. That is, in an exemplary embodiment, the extensible layer 2 may be further equipped with a Multi-factor Authentication (MFA) mechanism using the message for key exchange, thereby enabling easy identification of a cloned CM. Additionally, the extensible message may still further offer device synchronization with updated server lists, thereby enabling easy prevention of a forged server or server address (e.g., DHCP). Furthermore, because of the backward compatibility capabilities described above, legacy devices will always be able to perform such updated security features once enabled with the extensible layer 2 message.

FIG. 2 is a schematic illustration depicting an exemplary implementation of a cross protocol payload (XPP) 200. In an exemplary embodiment, XPP performs a similar function to extensible BPKM message 112, FIG. 1, except XPP 200 is defined herein as the universal payload format for an extensible layer 2 message. That is, whereas extensible BPKM message 112 is a type of XPP 200 that may be specific to DOCSIS, XPP 200 is universally applicable to any layer 2 MAC frame or message structure.

In the exemplary embodiment depicted in FIG. 2, XPP 200 is illustrated as being implemented with respect to a MAC Management Message (MMM). In DOCSIS, an MMM refers to unclassified traffic between a CMTS and a CM, such as MAC domain descriptors, ranging requests, ranging responses, upstream channel descriptor messages, etc. In this embodiment therefore, XPP 200 defines a new type of payload for the MMM, thereby effectively rendering an MMM into a new, extensible MMM, or X-MMM, as also referred to herein.

In the exemplary embodiment depicted in FIG. 2, for an X-MMM implementation, XPP 200 includes at least (a) an X-MMM header portion 202, and (b) an X-MMM payload portion 204 containing encapsulated data 206. X-MMM header portion 202 includes one or more of type data 208, length data 210, extended length data 212, and flag data 214. Type data 208 may, for example, include an identifier (e.g., 16-bit) indicating the type of encapsulated data (e.g., 1=DOCSIS, 2=3GPP NAS, . . . , 14=EAP, etc.). Length data 210 (e.g., 16-bit) may indicate the length of the encapsulated data that can span across multiple X-MMM message fragments, whereas extended length data 212 (e.g., 32-bit) may indicate the length of the encapsulated data that can span across multiple X-MMM messages due to fragmentation. Flag data 214 (e.g., 32-bit), on the other hand, may include one or more flags used to control the processing of X-MMM messages, including without limitation, fragment control and message priority.

In an embodiment, X-MMM payload portion 204 may have a length at least as great as the size of extended length data 212. Encapsulated data 206 may include one or more messages similar to those described above with respect to extensible BPKM message 112, FIG. 1, including without limitation, EAP messages, 3GPP NAS messages, remote attestation messages, etc. Utilization of XPP 200 for an X-MMM is described further below with respect to FIG. 3.

Figure 3:
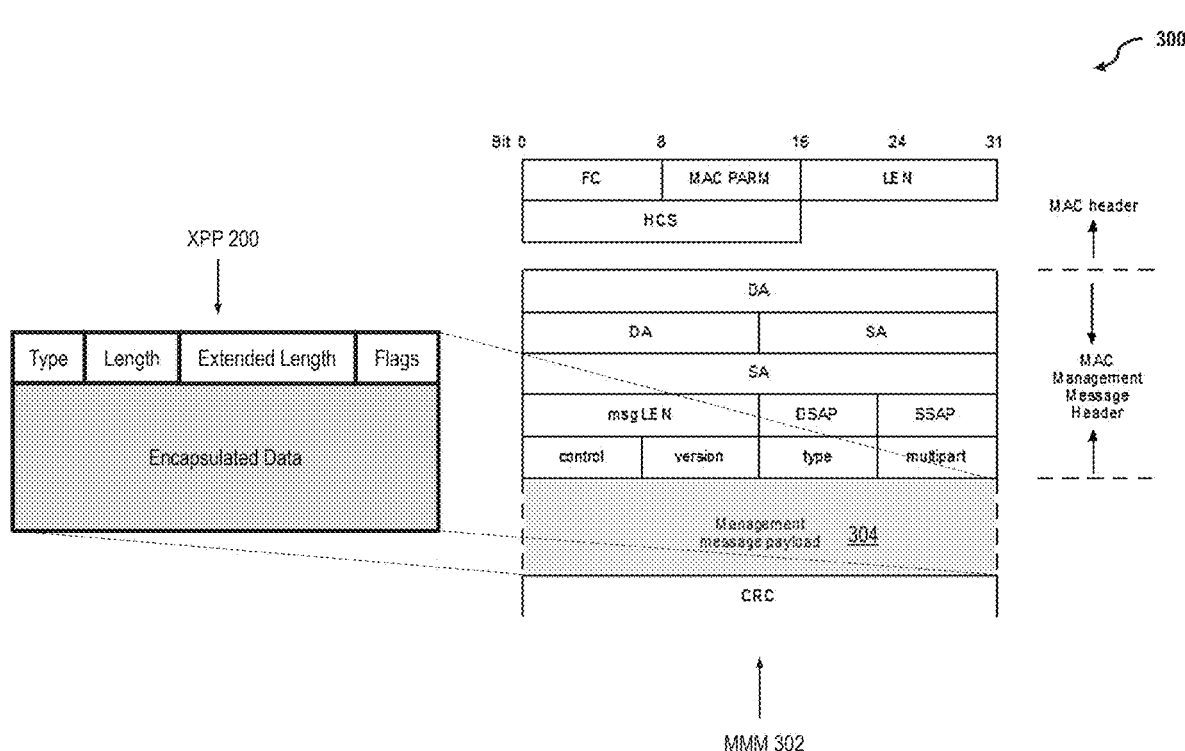
FIG. 3 is a schematic illustration depicting an exemplary data architecture for an extensible media access control management message, in accordance with an embodiment.

FIG. 3 is a schematic illustration depicting an exemplary data architecture 300 for an X-MMM. In the exemplary embodiment depicted in FIG. 3, X-MMM data architecture 300 includes an MMM structure 302 similar to a conventional DOCSIS MMM, except that in data architecture 300, XPP 200 is included within a management message payload 304 of MMM structure 302. In exemplary operation of data architecture 300, XPP 200 is transported between a modem and an MTS within MMM structure 302, thereby rendering a conventional DOCSIS MMM into a DOCSIS X-MMM as defined herein, such as a DOCSIS MMM carrying an XPP payload (e.g., MMM structure 302+XPP 200).

In an embodiment, the improved X-MMM may further include a code field indicating whether the X-MMM is an X-MMM request or an X-MMM response. For example, within data architecture 300, two new codes, respectively, may be reserved for the X-MMM: (1) XPP-REQ (i.e., from the modem to the MTS); and (2) XPP-RSP (i.e., from the MTS to the modem). In exemplary implementation of data architecture 300, the modem may initiate a request to access a layer 2 service by issuing an X-MMM message to the MTS. The MTS may process the X-MMM from the modem and, for supported encapsulation types, and then re-route the message (e.g., at the application layer) to the appropriate service relevant to the request. In some embodiments, such as in the case where an encapsulation type is not supported, the MTS may drop the X-MMM message.

Thus, the relevant device (e.g., modem or MTS) may be advantageously configured to generate extended message requests or replies that include an XPP in the respective payload portions thereof. In cases where the receiving device is not XPP-enabled (or not enabled for particular protocol or media types included in the XPP), the non-enabled device may simply drop the received frame/packet. As described further below with respect to FIG. 4, the XPP may additionally be advantageously extended to non-DOC-SIS networks using layer 2 frames and/or MAC layer messages.

FIG. 4 is a schematic illustration depicting an exemplary network architecture 400 for implementing one or more of the embodiments herein. In the exemplary embodiment depicted in FIG. 4, network architecture 400 is depicted as a 3GPP architecture, where a 3GPP user equipment device (UE) 402 may perform as a DOCSIS modem/CM, and where a 3GPP mobility management entity (MME) 404 may perform as the DOCSIS MTS/CMTS. That is, the extensible layer 2 messages of the present embodiments may be easily extended to non-DOCSIS networks (e.g., 3GPP) that provide a specific MAC format capable of the extension. In this context, new types of extensible MAC messages may be defined for the non-DOCSIS context, similarly to the extensible layer 2 messages described above with respect to the DOCSIS context, namely, non-DOCSIS MAC messages upgraded to carry XPPs or extensible payloads.

In an exemplary embodiment, an extensible payload/XPP (e.g., XPP 200, FIG. 2) is included in a basic 5G NAS message to produce an extensible NAS message in a non-DOCSIS context (e.g., an effective implementation of DOC-SIS BPI+ over 4G or 5G). Within network architecture 400, extensible 5G NAS messages are exchanged between UE 402 and MME 404, similarly to how an X-MMM is exchanged between a modem/CM and an MTS/CMTS in the DOCSIS context. By transporting an XPP within the payload portion of the NAS message, an NAS message advantageously becomes an extensible NAS message in a manner similar to the principles described above.

As described further below with respect to FIGS. 5-14, implementation of XPP 200 enables a number of new use cases that achieve significant benefits in comparison with conventional techniques, including without limitation: (a) automatic AAA routing, where an XPP may encapsulate EAP messages to the CMTS, such that the CMTS is now enabled to remotely act as the authenticator without the need for the CM to be provisioned with any configuration; (b) device synchronization, where an XPP may encapsulate the Network Time Protocol (NTP) or the Precision Type Protocol (PTP); (c) authentication augmentation, where an XPP may encapsulate data to augment authentications such as time-based or hash-based token generation/validation, for example; (d) PKI services, where an XPP may encapsulate certificate renewal or provisioning protocols (e.g., Certificate Management Protocol (CMP), Cryptographic Message Syntax (CMS), Certificate Management over CMS (CMC), etc.) without the need for EAP support; (e) crypto agility enhancement, where an XPP may encapsulate quantum-resistant authentication protocols and/or token; and (f) DPP over DOCSIS, where an XPP may encapsulate DPP messages to be processed on the CMTS rather than on the CM or access point (AP).

Layer 2 Extensible Message Use Cases

Figure 5:
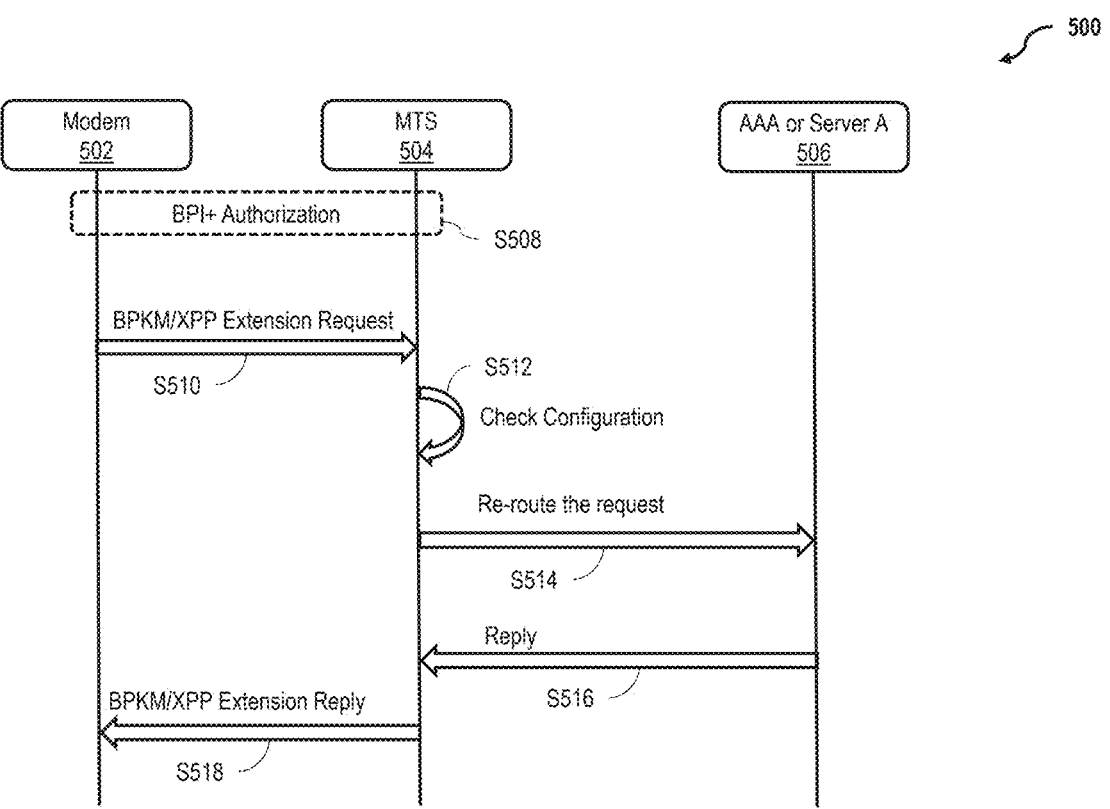
FIG. 5 is a sequence flow diagram depicting an exemplary authentication process utilizing the exemplary extensible messages of the present embodiments.

FIG. 5 is a sequence flow diagram depicting an exemplary authentication process 500 utilizing the exemplary extensible messages of the present embodiments. In the exemplary embodiment depicted in FIG. 5, process 500 may be executed with respect to a modem 502, an MTS 504, and an authentication server 506 (e.g., an AAA server). For the exemplary use case represented by process 500, MTS 504 is enabled to effectively act as the service router.

In exemplary operation, process 500 begins at optional step S508, in which a BPI+ authorization may be executed between modem 502 and MTS 504. In recent DOCSIS versions, for example, a new Early Authorization and Encryption (EAE) feature a device (e.g., a modem) to begin BPI+ with an MTS even before the device is provisioned with IP connectivity. Process 500 then proceeds to step S510 (or begins at step S510, in the case where optional BPI+ authentication is not performed), in which modem 502 sends an extension request, including an extensible layer 2 message (e.g., extensible BPKM, XPP, etc. according to the embodiments described above), to MTS 504. In an exemplary embodiment of step S510, the extension request includes a particular request for service from server 506.

In step S512, MTS 504 checks the configuration and determines whether the extension request should go to server 506. Assuming that the configuration is appropriate for the request, in step S514, MTS 504 re-routes the request to server 506. In step S516, server 506 sends a reply to MTS 504 including the relevant data for modem 502 in response to the request. In step S518, MTS 504 sends an extension reply (extensible BPKM, XPP, etc.) to modem 502 including the data provided from server 506.

According to process 500, by utilizing the extensible layer 2 messages of the present embodiments, convergence in a DOCSIS infrastructure may be more advantageously supported by enabling MTS 504 to act as the service router. For example, in a converged network, operators need to have the ability to authenticate, configure, and manage user devices. Utilizing extensible layer 2 messages, the operators may now simply use the MTS or CMTS as the service router to offer the configuration of authentication servers in communication with the MTS/CMTS.

In one exemplary case scenario of process 500, where an operator seeks to configure AAA services for home devices beyond the CM (e.g., modem 502), the home device may then become the supplicant seeking to authenticate to the AAA server (e.g., server 506). In this case, the CM may act as the authenticator by adding AAA configuration to the CM from an MTS (e.g., MTS 504) over an extensible BPKM message (or X-MMM). This exemplary scenario thus demonstrates a significant improvement over conventional techniques by eliminating the need for the network operator to configure the WPA end entity for home devices. In the conventional paradigm, for example, each CM must be configured with a secret, which may be particularly challenging in the case where hundreds of individual CMs communicate with a single CMTS. Such secrets are susceptible to theft and/or hacking. According to process 500 though, the CM does not need to be configured, thus entirely avoiding the need for secrets.

In an alternative case scenario of process 500, MTS 504 may simply operate as a generic 0-configure service router. In this case, modem 502 need not be configured, and may instead simply utilize the connected network for desired services; MTS 504 may itself host the configuration, re-route messages, and access resources as needed.

Figure 6:
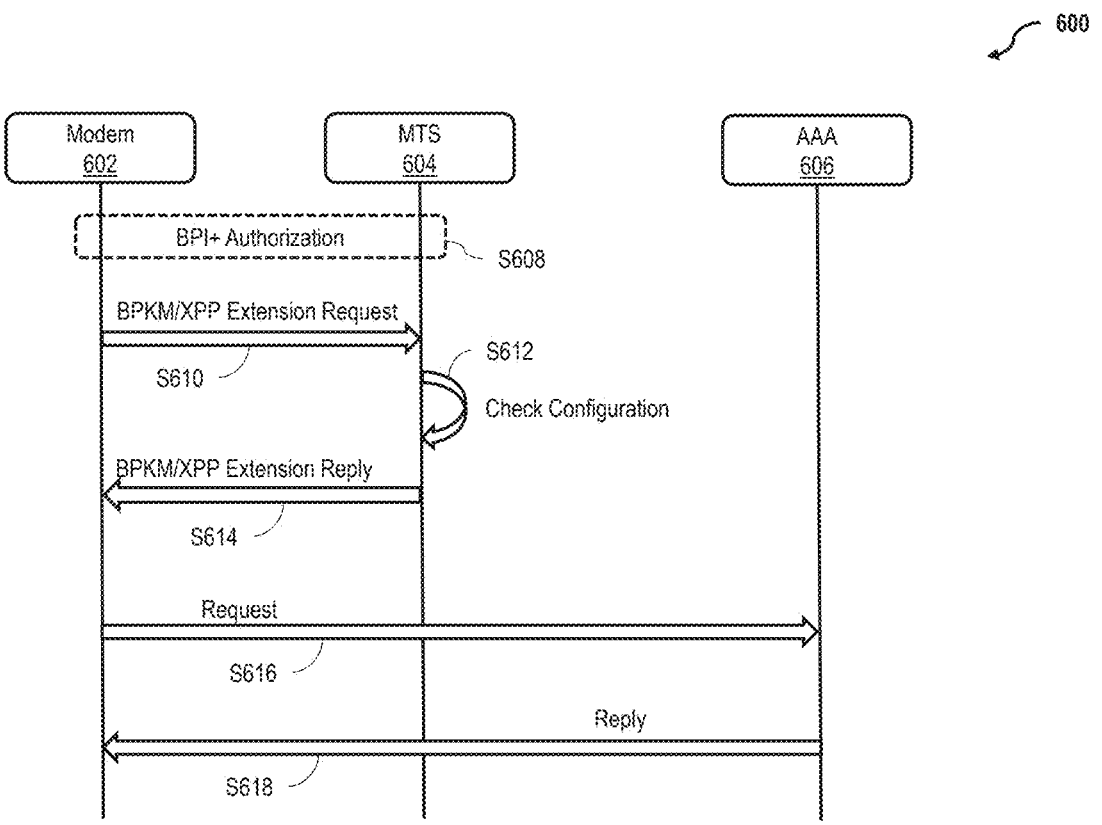
FIG. 6 is a sequence flow diagram depicting an exemplary configuration process utilizing the exemplary extensible messages of the present embodiments.

FIG. 6 is a sequence flow diagram depicting an exemplary configuration process 600 utilizing the exemplary extensible messages of the present embodiments. In the exemplary embodiment depicted in FIG. 6, and similar to process 500, FIG. 5, process 600 may also be executed with respect to a modem 602, an MTS 604, and an authentication server 606 (e.g., an AAA server). The exemplary use case represented by process 600 though, demonstrates how modem 602 is enabled to obtain configuration from MTS 604. It may be noted that processes 500 and 600 are not exclusive of one another.

In exemplary operation, process 600 begins at optional step S608, in which a BPI+ authorization may be executed between modem 602 and MTS 604. In step S610, modem 602 sends an extension request to MTS 604. In an exemplary embodiment of step S610, the extension request includes a request for configuration for a particular service (e.g., "service A"). In step S612, MTS 604 checks the configuration and determines that the extension request is for a service provided by server 606.

In step S614, MTS 604 sends an extension reply (BPKM, XPP, etc.) to modem 602 including the configuration for the particular service (e.g., service A) requested in the extension request. In step S616, modem 602 sends a direct request to server 606 for the particular service (service A), and in step S618, server 606 sends a reply directly to modem 602 including the relevant data in response to the direct request from step S616.

According to process 600, network operators are further enabled to configure services (e.g., AAA services) for home devices beyond modem 602. For example, by enabling a CM (e.g., modem 602) to get its configuration from the CMTS (e.g., MTS 604), the home device may again become the supplicant seeking authentication from the AAA server (e.g., server 606). In this exemplary case scenario, the CM may again act as the authenticator, and now forward the AAA requests to CMTS over an extensible BPKM message (or X-MMM) without the needs for pre-configuration, namely, a CM with zero needed configuration.

Figure 7:
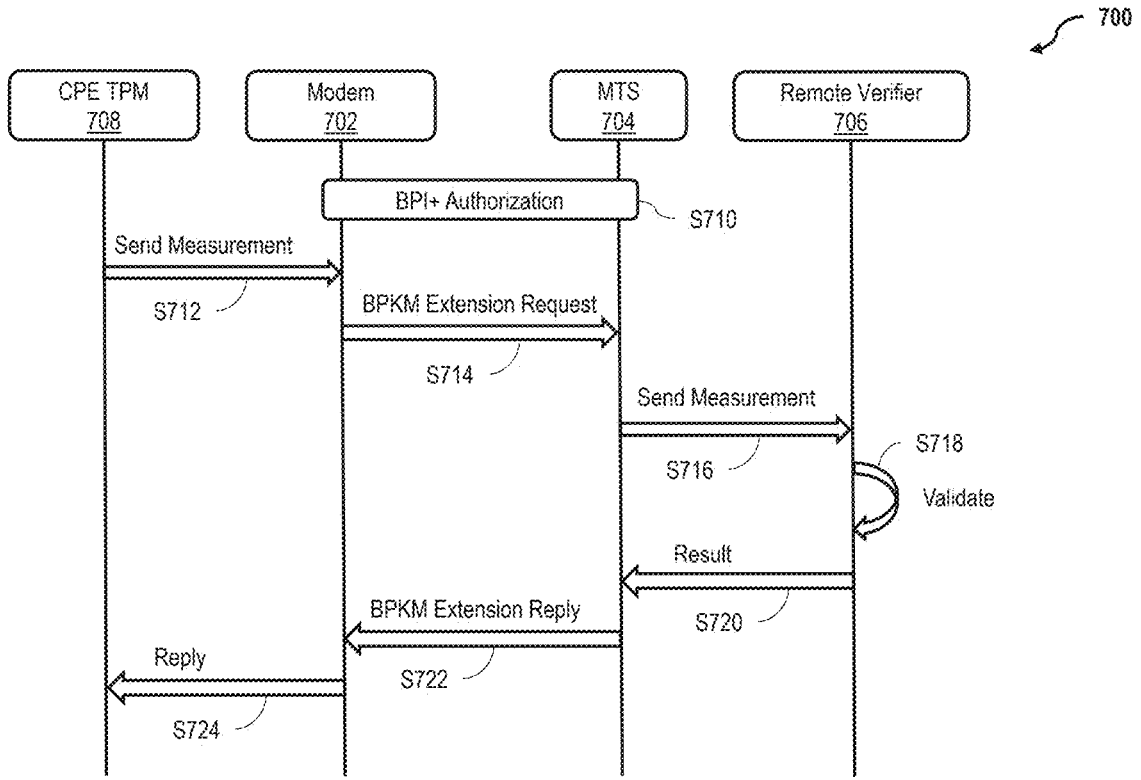
FIG. 7 is a sequence flow diagram depicting an exemplary attestation process utilizing the exemplary extensible messages of the present embodiments.

FIG. 7 is a sequence flow diagram depicting an exemplary attestation process 700 utilizing the exemplary extensible messages of the present embodiments. Similar to processes 500, FIG. 5, and 600, FIG. 6, process 700 may be executed with respect to a modem 702, an MTS 704, and remote verifier (e.g., server or device) 706. Process 700 may be further executed with respect to a trusted platform module (TPM) 708 of a customer premises equipment (CPE) in communication with modem 702, and is not exclusive of processes 500 or 600.

In exemplary operation, process 700 begins at step S710, in which a BPI+ authorization is executed between modem 702 and MTS 704. In step S712, CPE TPM 708 sends an attestation message, including measurement information, to modem 702. In step S714, modem 702 sends a BPKM extension request to MTS 704. In an exemplary embodiment of step S714, the BPKM extension request includes the measurement information from CPE TPM 708, a TPM identity certification, and/or other relevant information for CPE attestation. For ease of explanation, the following discussion refers to BPKM extension requests by way of example, and not in a limiting sense. The person of ordinary skill in the art will appreciate that the use case embodiments described herein may utilize one or more of the innovative layer 2 messaging embodiments described above without departing from the scope herein.

In step S716, MTS 704 forwards the measurement information to remote verifier 706. In step S718, remote verifier 706 validates the measurement information and, in step S720, informs MTS 704 of the results of the validation performed in step S718. In step S722, MTS 704 sends a BPKM extension reply to modem 702 regarding the CPE attestation. In step S724, modem 702 sends a reply to CPE TPM 708 confirming the CPE remote attestation.

According to process 700, through the advantageous use of an extensible BPKM message, the CPE attestation message may easily be sent through the network by way of a communication device (e.g., modem 702) that has already been authenticated and secured by BPI+ (e.g., in step S710). This new capability for remote CPE attestation is particularly valuable in the case where it is desirable, or even necessary, for a customer home device (e.g., CPE TPM 708) to be able to perform remote attestation.

The person of ordinary skill in the art will appreciate that modem 702 and CPE TPM 708 are described herein by way of example, and not in a limiting sense. Other edge devices may be utilized in this embodiment, as well as for several of the other embodiments and use cases described throughout this disclosure, without departing from the scope herein.

Figure 8:
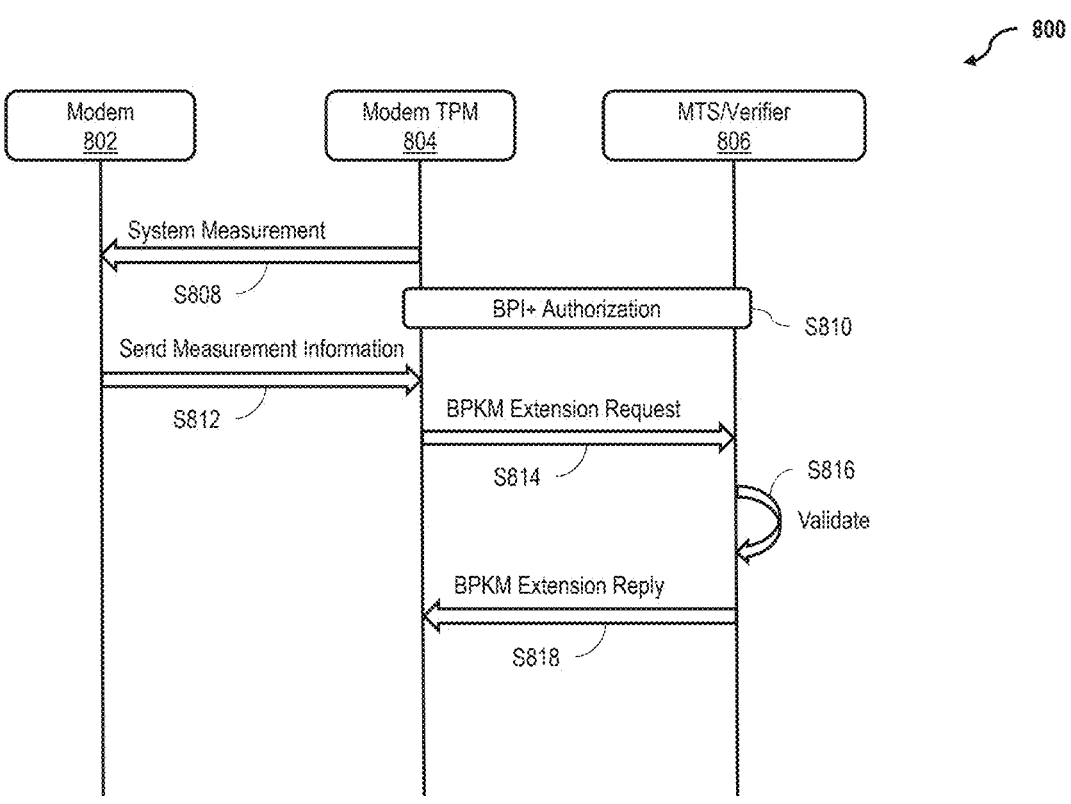
FIG. 8 is a sequence flow diagram depicting an alternative attestation process utilizing the exemplary extensible messages of the present embodiments.

FIG. 8 is a sequence flow diagram depicting an alternative attestation process 800 utilizing the exemplary extensible messages of the present embodiments. Process 800 is similar, in some aspects, to process 700, FIG. 7, and may be executed with respect to a modem 802 including a modem TPM 804, and an MTS 806. In the exemplary embodiment depicted in FIG. 8, MTS 806 may additionally act as the verifier/remote verifier. Process 800 thus demonstrates an alternative approach where remote attestation is achieved with modem 802.

In exemplary operation, process 800 begins at step S808, in which modem TPM 804 provides a system measurement to modem 802. In step S810, a BPI+ authorization is executed between modem TPM 804 and MTS 806. In step S812, modem 802 sends measurement information to modem TPM 804. In step S814, modem TPM 804 sends a BPKM extension request to MTS 806. In an exemplary embodiment of step S814, the BPKM extension request includes the measurement information from modem 802, a TPM identity certification, and/or other relevant information for the remote attestation. In step S816, MTS 806, acting as the verifier (or in communication with a separate remote verifier, as described above with respect to FIG. 7) validates the measurement information and, in step S818, sends a BPKM extension reply to modem TPM 804 including the results of the validation performed in step S816.

According to process 800, the extensible layer 2 messages of the present embodiments may be utilized to enable remote attestation, or other types of services) of a CM (e.g., modem 802/modem TPM 804) or other types as a new feature to be introduced into next-generation DOCSIS versions. This new capability for remote CM attestation is particularly valuable in the case where it is desirable for a CM to be able to perform its own remote attestation on configuration (or a booted image) to avoid, or greatly reduce, the need for device reboot or a truck rolls. In such exemplary used cases, the network operator is enabled to ask the modem/CM to always perform its own remote attestation, and the MTS/CMTS may advantageously act as the remote verifier. Similar to process 700, FIG. 7, according to process 800, the CM attestation message may easily be sent through the network as a BPKM message/extension request since the CM (e.g., modem TPM 804) has already been authenticated and secured by BPI+ (e.g., in step S810).

Figure 9:
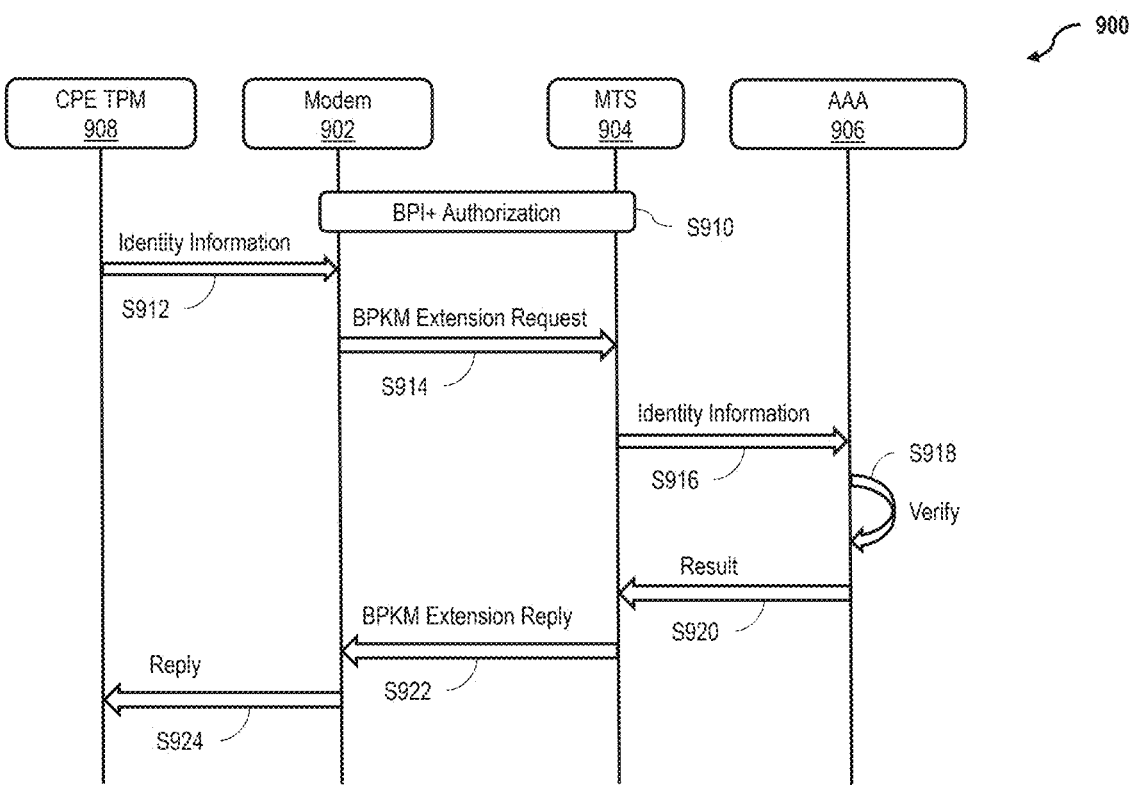
FIG. 9 is a sequence flow diagram depicting an alternative attestation process utilizing the exemplary extensible messages of the present embodiments.

FIG. 9 is a sequence flow diagram depicting an alternative attestation process 900 utilizing the exemplary extensible messages of the present embodiments. Process 900 is similar, in many aspects, to process 700, FIG. 7, and may also be executed with respect to a modem 902, an MTS 904, an AAA server 906 acting as the remote verifier, and a CPE TPM 908 in communication with modem 902. Process 900 thus demonstrates an alternative remote attestation and device authentication use case scenario utilizing the present extensible layer 2 message embodiments.

In exemplary operation, process 900 begins at step S910, in which a BPI+ authorization is executed between modem 902 and MTS 904. In step S912, CPE TPM 908 sends an attestation message, including device identity information (e.g., EAP-TLS), to modem 902. In step S914, modem 902 sends a BPKM extension request to MTS 904. In an exemplary embodiment of step S914, the BPKM extension request includes the identity information from CPE TPM 908. In step S916, MTS 904 forwards the identity information to AAA server 906. In step S918, AAA server 906 verifies the identity information and, in step S920, informs MTS 904 of the results of the verification performed in step S918. In step S922, MTS 904 sends a BPKM extension reply to modem 902 regarding the CPE verification results. In step S924, modem 902 sends a reply (e.g., also EAP-TLS) to CPE TPM 908 confirming the CPE authentication and remote attestation.

As illustrated with respect to process 900, the extensible layer 2 messages of the present embodiments are enabled to carry other protocol frame data (e.g., EAP) for device authentication. Having such additional information in the BPKM message thus advantageously enables a CM and/or a CMTS to easily parse the relevant content. Such new remote CPE attestation capabilities further enable easy authentication with other devices. For example, if a first device does not recognize a particular user, a different second device may be used for reset and/or authentication. Furthermore, in the case where one device may have better security than other devices (for example, a laptop computer is typically configured with a TPM chip), the improved-security device may be configured as the primary device for authentication.

In an embodiment, a device user may be further enabled to utilize its own user credential to encrypt the message and/or to attest the device identity. According to process 900, the MTS (e.g., MTS 904) is advantageously enabled to aid in the routing of device traffic to a trusted AAA server (e.g., AAA server 906), and without requiring customer configuration for modem 902.

Figure 10:
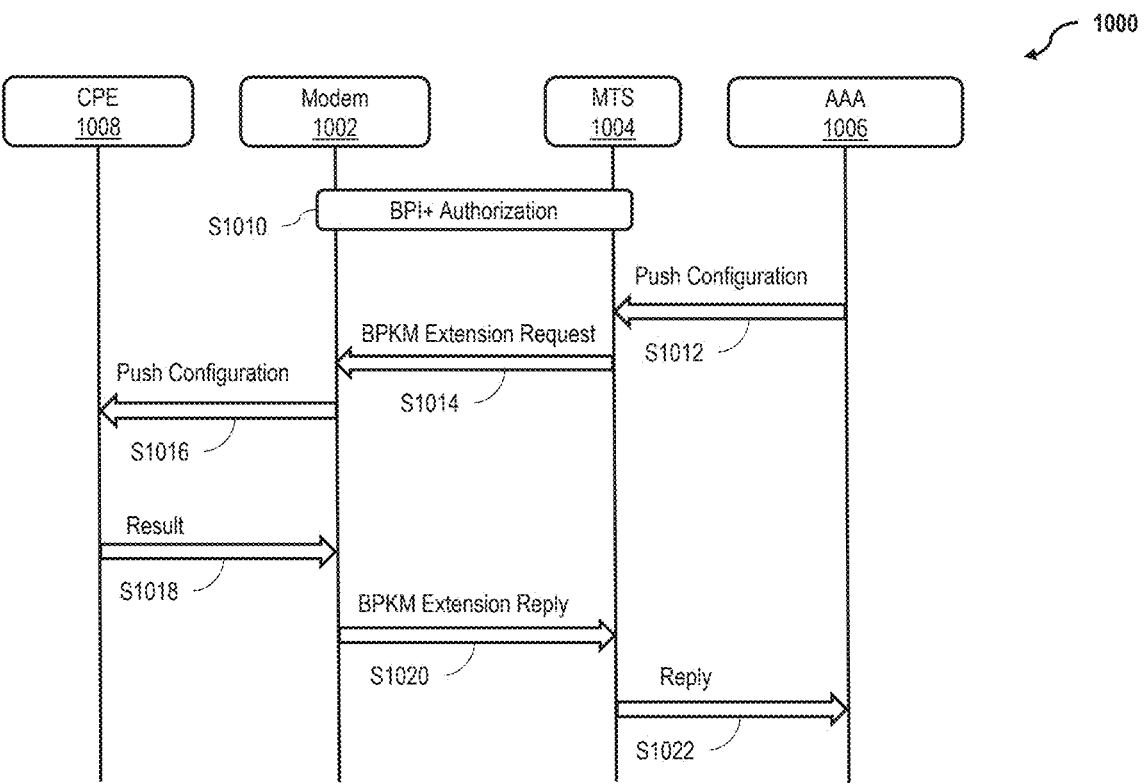
FIG. 10 is a sequence flow diagram depicting an exemplary device management process utilizing the exemplary extensible messages of the present embodiments.

FIG. 10 is a sequence flow diagram depicting an exemplary device management process 1000 utilizing the exemplary extensible messages of the present embodiments. Process 1000 is similar, in some aspects, to one or more of the several processes described above, and represents a further, non-exclusive, use case that may also be executed with respect to a modem 1002, an MTS 1004, an AAA server 1006, and a CPE 1008 in communication with modem 1002.

In exemplary operation, process 1000 begins at step S1010, in which a BPI+ authorization is executed between modem 1002 and MTS 1004. In step S1012, AAA server 1006 sends a push configuration to MTS 1004. In step S1014, MTS 1004 sends a BPKM extension request to modem 1002 including the push configuration information. In step S1016, modem 1002 forwards the push configuration information to CPE 1008. In step S1018, CPE 1008 provides the results thereof to modem 1002. In step S1022, modem sends a BPKM extension reply to MTS 1004. In step S1024, MTS 1004 sends a reply to AAA server 1006.

According to process 900, an extensible layer 2 message according to the present embodiments further advantageously enables easy updating of device credentials, and management of the transmit channel or service policy for devices beyond the CM. Systems and methods according to this exemplary use case still further enables extension of the principles herein to wireless or mobile networks. For example, 3GPP Authentication Messages (e.g., AKA) and NAS messages may be carried within the extensible layer 2 message to further enable SIM-based authentication and/or other 3GPP operations. In such cases, the MTS may act as an eNodeB/gNodeB device, and the modem may provide 4G/5G hotspots or home service, thereby enabling 3GPP roaming on a DOCSIS network.

Figure 11:
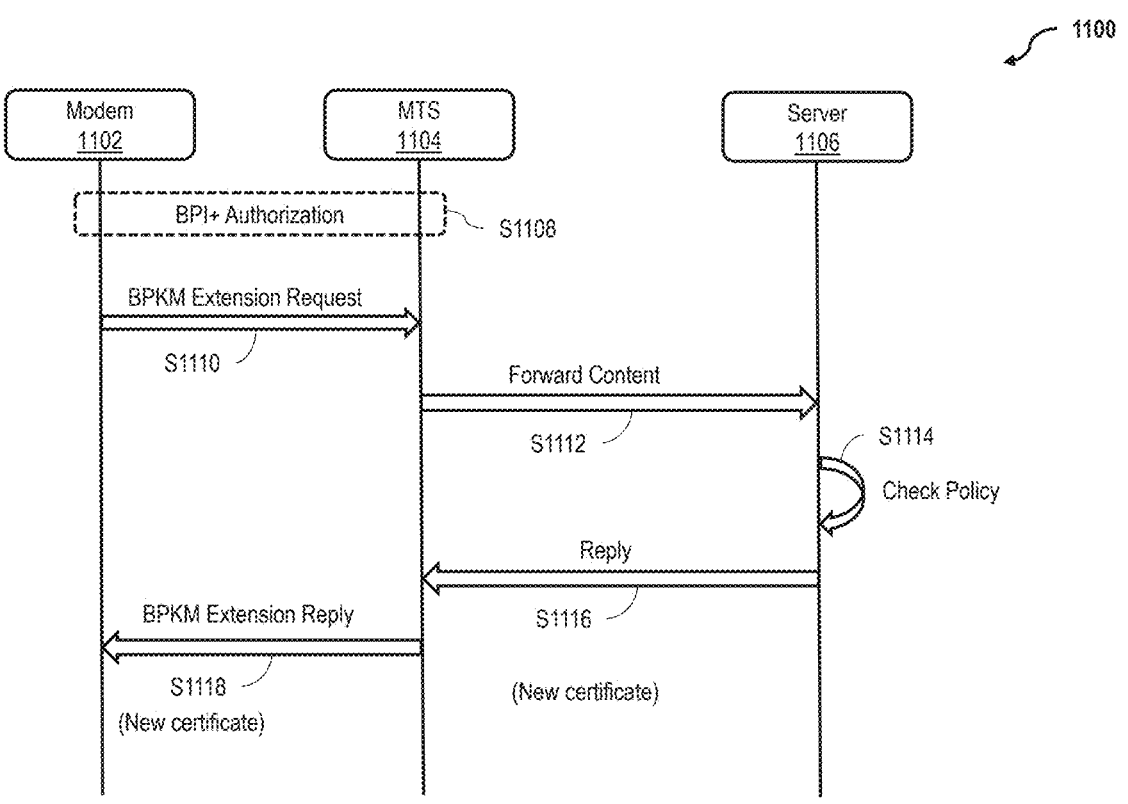
FIG. 11 is a sequence flow diagram depicting an exemplary service renewal process utilizing the exemplary extensible messages of the present embodiments.

FIG. 11 is a sequence flow diagram depicting an exemplary service renewal process 1100 utilizing the exemplary extensible messages of the present embodiments. Process 1100 shares some similar aspects with one or more of the several processes described above, and represents a further, non-exclusive, use case for requesting PKI services, which may be executed with respect to a modem 1102, an MTS 1104, and a remote server 1106.

In exemplary operation, process 1100 begins at optional step S1108, in which a BPI+ authorization is executed between modem 1102 and MTS 1104. In step S1110, modem 1102 sends a BPKM extension request to MTS 1104. In an exemplary embodiment of step S1110, the BPKM extension request includes, within the XPP, a request for PKI services, such as certificate renewal, and an ACM protocol encapsulated within the extensible layer 2 message. In step S1112, MTS 1104 forwards the content of the BPKM extension request to remote server 1106. In an exemplary embodiment of step S1112, the forwarded content includes certificate information related to the ACM protocol. In step S1114, remote server 1106 performs a policy check and, in step S1116, sends a reply to MTS 1104. In an exemplary embodiment of step S1116, the reply includes a new certificate after a successful policy check. In step S1118, MTS 1104 sends a BPKM extension reply to modem 1102 regarding the CPE attestation. In an exemplary embodiment of step S1118, the BPKM extension reply includes the new certificate.

According to exemplary use case of process 1100, there is no need to disclose the certificate service to the public network. That is, some network operators may wish to provide PKI renewal services, but may not want to disclose such services to public view. PKI services such as certificate renewal may therefore be successfully executed by performing a trust anchor update using the ACM protocol encapsulated within the BPKM extension/extensible layer 2 message.

In the case where BPI+ is disabled (or not optionally performed), a service-requesting device (e.g., modem 1102) may alternatively initially use a protocol such as EAP-TLS for encryption and/or authentication and, subsequently, EAP-CREDS to transmit the credentials or related information. Alternatively, in the case where BPI+ is enabled (e.g., optional step S1108), the service-seeking device may simply use EAP-CREDS, since there will be no need for adding another phase one protocol for establishing the secured channel.

FIGS. 12A-B are sequence flow diagrams depicting an exemplary two factor authentication (2FA) process 1200 utilizing the exemplary extensible messages of the present embodiments. Process 1200 shares some similar aspects with one or more of the several processes described above, and represents a further, non-exclusive, use case for 2FA using extensible layer 2 message payloads accomplished through the MAC layer, as opposed to the conventional techniques using the application layers.

More specifically, FIG. 12A illustrates an exemplary operation of process 1200 executed with respect to a device 1202 (e.g., a modem or CM) and an MTS 1204. In exemplary operation, process 1200 begins at optional step S1206, in which a BPI+ authorization is executed between device 1202 and MTS 1204. In step S1208, device 1202 sends a first BPKM extension request to MTS 1204. In an exemplary embodiment of step S1208, the first BPKM extension request includes, within the XPP, an indication that device 1202 supports extensible messages, as well as a request to set up a key or symmetric keys with MTS 1204. In step S1210, MTS 1204 sends device 1202 a first BPKM extension reply to device 1202. In an exemplary embodiment of step S1210, the extensible payload of the BPKM extension reply includes an authentication challenge for device 1202. In step S1212, device 1202 sends a second BPKM request to MTS 1204, which includes a successful answer (e.g., a key) to the challenge.

FIG. 12B depicts a further, or alternative exemplary operation of process 1200, in which a cloned device 1214 attempts to connect with MTS 1204. In this scenario, process 1200 similarly begins at optional step S1216, in which a BPI+ authorization may have been executed between cloned device 1212 and MTS 1204. In step S1218, MTS 1204 sends a BPKM extension request to cloned device. In an exemplary embodiment of step S1218, the BPKM extension request includes the challenge (e.g., from step S1210) within the XPP thereof. In step S1220, cloned device 1212 provided a BPKM extension reply to MTS 1204, including an answer (e.g., a key) in the XPP thereof. In this case, however, the answer/key from cloned device will not match the challenge, therefore process 1200 will proceed to step S1222, indicating an authentication failure.

According to the exemplary use case depicted in FIGS. 12A-B, a CM (e.g., device 1202) and a CMTS (e.g., MTS 1204) are enabled to advantageously use an extensible layer 2 message for setup of a symmetric key, or a different 2FA challenge, entirely within the MAC layer. The symmetric key(s) may then be used for multi-factor authentication (MFA), and/or for accessing external services provided by a third-party (e.g., cloud services). In an exemplary embodiment, process 1200 may further enable the CMTS designation to restrict communications from device 1202 to only the CMTS (e.g., MTS 1204) that has the relevant information for that device. Therefore, in the case where the certificate or key is compromised, 2FA operates to provide a second gate for backup.

Furthermore, by using the extensible layer 2 message to set up symmetric keys, network operators are enabled to more easily avoid compromised certificates or CM cloning (e.g., cloned device 1214). That is, where a certificate or key is compromised, 2FA within the extensible layer 2 message may provide the second gate as backup. Through this exemplary use case, network operators may more easily identify a cloned CM by its failure to provide a correct answer in a BPKM reply, for example, in a case where different symmetric keys appear for the same certificate (e.g., the correct symmetric key for device 1202, but an incorrect symmetric key for cloned device 1212). As illustrated with respect to FIG. 12, the extensible layer 2 messages of the present embodiments are sufficiently versatile to enable further extension of the XPP to include additional messages that need not be specific to a particular protocol.

FIG. 13 is a sequence flow diagram depicting an exemplary device synchronization process 1300 utilizing the exemplary extensible messages of the present embodiments. Process 1300 shares some similar aspects with one or more of the several processes described above, and represents a further, non-exclusive, use case that may be executed with respect to a modem 1302, an MTS 1304, and a time server 1306.

In exemplary operation, process 1300 begins at optional step S1308, in which a BPI+ authorization is executed between modem 1302 and MTS 1304. In step S1310, time server 1306 provides, to MTS 1304, signed and/or stamped time information indicating the current time from time server 1306. In step S1312, MTS 1304 sends a BPKM extension request to modem 1302. In an exemplary embodiment of step S1312, the BPKM extension request includes the signed time information, as well as information or instructions enabling modem 1302 to update its current time and/or execute time re-synchronization. In step S1314, modem 1302 updates its current time according to the information provided in the BPKM extension request. In an exemplary embodiment of step S1314, modem 1302 updates its list of available DHCP, TFTP, and/or time servers according to the BPKM extension request information. In step S1316, modem 1302 sends a BPKM extension reply to MTS 1304 indicating that the modem 1302 has been synchronized/re-synchronized according to the BPKM extension request.

According to the exemplary use case provided according to process 1300, an extensible layer 2 message may be further advantageously utilized for leveraging the existing timing protocol, as well as device configuration synchronization. Utilization of process 1300 is therefore of particular utility in the case where a threat is detected; by providing updated configurations within the extensible layer 2 message, remediation of the detected threat is much more easily achieved.

FIG. 14 is a sequence flow diagram depicting an exemplary troubleshooting process 1400 utilizing the exemplary extensible messages of the present embodiments. Process 1400 shares some similar aspects with one or more of the several processes described above, and represents a further, non-exclusive, use case that may be executed with respect to one or more modems 1402, an MTS 1404, and an operator system 1406 (e.g., device or server) to perform layer 2 troubleshooting.

In exemplary operation, process 1400 begins at optional step S1408, in which a BPI+ authorization is executed between at least one modem 1402 and MTS 1404. In step S1410, operator system 1406 sends a configuration request to MTS 1404 to access one or more modems 1402 in communication with MTS 1404. In some cases, modems 1402 may, for example, represent a modem cluster having hundreds of individual modems 1402 communicating with MTS 1404 (e.g., point-to-multipoint). In step S1412, MTS 1404 sends a BPKM extension request to at least one modem 1402. In an exemplary embodiment of step S1412, the BPKM extension request includes configuration information from the operator request in step S1410. In step S1414, at least one modem 1402 sends a BPKM extension reply to MTS 1404 indicating configuration success for that modem 1402. In step S1416, MTS sends a reply to operator system 1406 of the successful performance by the at least one modem 1402. In an embodiment, one or both of the request from (i.e., step S1410) and reply to (i.e., step S1416) operator system 1406 may be executed using a secure shell (SSH) protocol.

Thus, according to the exemplary use case represented by process 1400, the extensible layer 2 message may be still further utilized for troubleshooting layer 2 issues, which is of particular utility in the case where IP connection is not available. According to the exemplary embodiment depicted in FIG. 14, a network operator (e.g., operator system 1406) is advantageously enabled access to a cluster of CMs (e.g., modems 1402) that may be managed by other parties or vendors without knowing the identity of the user or customer associated with a particular CM.

According to the embodiments described above, a universal payload format—the XPP—is introduced for layer 2 MAC frames, including but not limited to DOCSIS frames, which are enabled to "generically" encapsulate specific payloads and mark the encapsulated payloads as a specific protocols/media. As one example, an IEEE EAP identifier may be identified to encapsulate EAP payloads inside the MAC frame, similar to conventional techniques. The XPP of the present embodiments though, further enables—within the same payload—the identification of other types of messages, such as a remote attestation message, and both such message types may thus be identified and encapsulated within the request and reply messages thereof between two devices in both respective directions.

Additionally, or alternatively, Bluetooth frames, identifiers, or protocol content information may be carried within the XPP data such that a Bluetooth controller may be cloud based, for example. In a similar manner, 3GPP NAS messages and additional information may be transported according to the same principles, namely, entirely through the MAC layer without need of additional messaging through the application layer.

Furthermore, on the MTS/CMTS side (or the equivalent in other access network types), the device may be configured to process or ignore specific types of XPP data. That is, the device may be configured to process only enabled protocol or other message types, and also to drop or discard data from non-enabled protocols/message types. For example, when a packet having an XPP payload is received, the device may check the identifier(s) for the payload type(s) against supported types. If a match is found, the XPP packet then be processed, properly decapsulated, and re-routed to the associated service (e.g., managed either on the CMTS itself, or by a remote server/device at an external location). That is, an XPP-enabled payload may be decapsulated by the receiving device, and then re-routed to the service capable of handling the supported protocol/media type. If the relevant service is on the MTS, the XPP-enabled payload may be locally processed. Otherwise, the MTS will route the XPP-enabled payload to an appropriate server configured for the specific protocol/media type.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In exemplary embodiments, a processing element may be instructed to execute one or more of the processes and subprocesses described above by providing the processing element with computer-executable instructions to perform such steps/sub-steps, and store collected data (e.g., time variant parameters, digital signatures, certificates, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably providing a plurality of protocols and functional capabilities within the layer 2 of a network. The present embodiments therefore improve the speed, efficiency, and reliability in which such functionality may be performed. Due to these improvements, the aspects described herein address computer-related issues that significantly improve over conventional fixed extensible message techniques. Thus, the aspects herein may be seen to also address computer-related issues such as communication between electronic computing devices or systems, for example.

Exemplary embodiments of systems and methods for improved extensible layer 2 messages are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device.

Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A transmitting communication device, comprising:
a processor; and
a memory having computer-executable instructions stored therein, which, when executed by the processor, cause the transmitting communication device to:
generate at least one layer 2 message frame for delivery to a remote receiving device over an electronic communication network, the generated at least one layer 2 message frame including a cross protocol payload (XPP) comprising, within the same XPP:
a first protocol identifier identifying a first communication protocol;
a first protocol package containing first data content according to the first communication protocol;
a second protocol identifier identifying a second communication protocol different from the first communication protocol;
a second protocol package containing second data content according to the second communication protocol;
a media type identifier; and
media type content relevant to the media type identifier, wherein the media type content includes one or more of a request for service, a remote attestation message, a PKI certificate renewal request, a two-factor authentication key, signed time information, and a configuration request.

2. The transmitting communication device of claim 1, wherein the electronic communication network is a DOCSIS network.

3. The transmitting communication device of claim 2, comprising a modem.

4. The transmitting communication device of claim 3, wherein the modem includes at least one of a cable modem (CM), an optical network unit (ONU), a digital subscriber line (DSL) unit/modem, and a satellite modem.

5. The transmitting communication device of claim 3, wherein the remote receiving device includes a modem termination system (MTS).

6. The transmitting communication device of claim 5, wherein the MTS includes at least one of a cable MTS (CMTS), an optical network terminal (ONT), an optical line terminal (OLT), a network termination unit, and a satellite termination unit.

7. The transmitting communication device of claim 2, comprising a modem termination system (MTS).

8. The transmitting communication device of claim 7, wherein the remote receiving device includes a modem.

9. The transmitting communication device of claim 2, wherein the XPP further comprises an extensible baseline privacy key management (BPKM) message.

10. The transmitting communication device of claim 2, wherein the XPP further comprises an extensible media access control management message (X-MMM).

11. The transmitting communication device of claim 10, wherein the X-MMM includes (a) an X-MMM header portion, and (b) an X-MMM data portion including encapsulated data.

12. The transmitting communication device of claim 1, wherein the electronic communication network is a 3GPP network.

13. The transmitting communication device of claim 12, comprising a user equipment device (UE).

14. The transmitting communication device of claim 13, wherein the remote receiving device includes a mobility management entity (MME).

15. The transmitting communication device of claim 12, comprising a mobility management entity (MME).

16. The transmitting communication device of claim 15, wherein the remote receiving device includes a user equipment device (UE).

17. The transmitting communication device of claim 11, wherein the at least one layer 2 message frame comprises a 5G non-access stratum (NAS) message structure.

18. The transmitting communication device of claim 1, wherein the first protocol identifier identifies at least one of a DOCSIS protocol, a Wi-Fi protocol, a Bluetooth protocol, an extensible authentication protocol (EAP), and a 3GPP non-access stratum (NAS) protocol.

19. A computing device, comprising:
at least one processor; and
at least one memory having computer-executable instructions stored therein, which, when executed by the at least one processor, cause the at least one processor to:
generate at least one layer 2 message frame for delivery to a remote receiving device over an electronic communication network, the generated at least one layer 2 message frame including a cross protocol payload (XPP) comprising:
a first protocol identifier identifying a first communication protocol;
a first protocol package containing first data content according to the first communication protocol;
a second protocol identifier identifying a second communication protocol different from the first communication protocol;
a second protocol package containing second data content according to the second communication protocol;
a media type identifier; and
media type content relevant to the media type identifier, wherein the media type content includes one or more of a request for service, a remote attestation message, a PKI certificate renewal request, a two-factor authentication key, signed time information, and a configuration request.

20. A method comprising:
generating at least one layer 2 message frame for delivery to a remote receiving device over an electronic communication network, the generated at least one layer 2 message frame including a cross protocol payload (XPP) comprising:
a first protocol identifier identifying a first communication protocol;

a first protocol package containing first data content according to the first communication protocol;

a second protocol identifier identifying a second communication protocol different from the first communication protocol;

a second protocol package containing second data content according to the second communication protocol;

a media type identifier; and media type content relevant to the media type identifier, wherein the media type content includes one or more of a request for service, a remote attestation message, a PKI certificate renewal request, a two-factor authentication key, signed time information, and a configuration request.

*   *   *   *   *